Aug. 10, 1937.  J. R. WINTER  2,089,461
GREASE SEAL
Filed Sept. 18, 1933
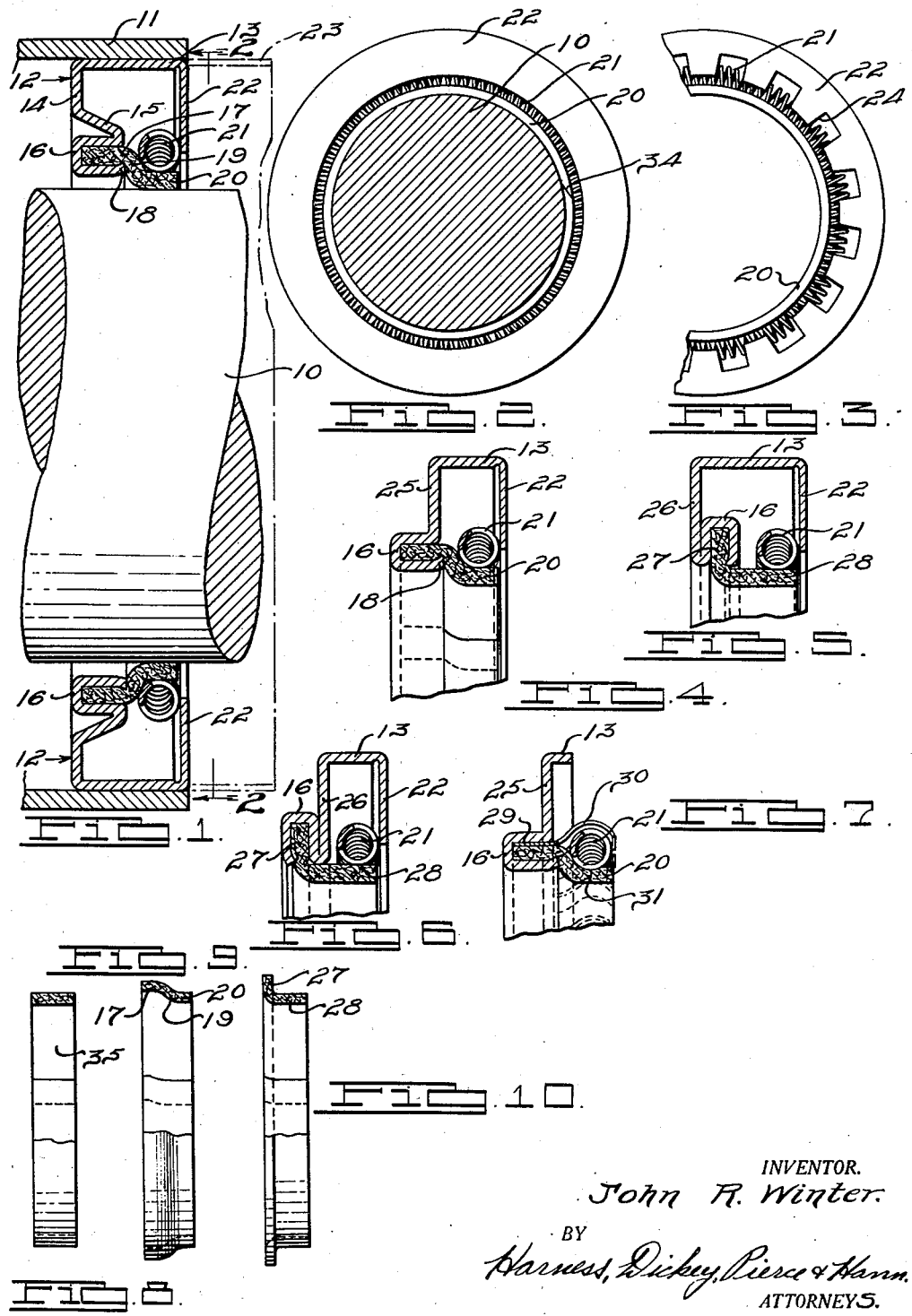
INVENTOR.
John R. Winter.
BY
Harness, Dickey, Pierce & Hann.
ATTORNEYS.

Patented Aug. 10, 1937

2,089,461

UNITED STATES PATENT OFFICE 2,089,461

GREASE SEAL

John R. Winter, Detroit, Mich.

Application September 18, 1933, Serial No. 689,812

15 Claims. (Cl. 288—1)

The invention relates to grease seals and it has particular relation to a grease seal adapted for use in a housing receiving a rotary shaft.

One object of the invention is to provide a grease seal for preventing the passage of lubricant or grease between relatively rotatable members, which may be manufactured at a minimum cost and by using a minimum number of parts.

Another object of the invention is to provide a grease seal of the above designated character which is highly efficient in operation as compared to grease seals that have heretofore been used.

Another object of the invention is to provide a grease seal involving a one-piece shell construction, so as to minimize the number of parts and reduce the cost of manufacturing the seal.

Another object of the invention is to provide a grease seal including a sealing ring of leather wherein the leather directly engaging the rotary shaft has its natural grain condition and is not substantially deformed.

Another object of the invention is to provide an improved leather sealing ring and method of manufacturing it which enables obtaining the most efficient use of the leather for sealing purposes particularly in grease seals such as designated.

Other objects of the invention will become apparent from the following description, the drawing relating thereto and from the claims hereinafter set forth.

For a better understanding of the invention reference may be had to the drawing, wherein:

Fig. 1 is a fragmentary view of a housing and rotary shaft therein, illustrating a grease seal within the housing and around the shaft which is constructed according to one form of the invention.

Fig. 2 is a cross-sectional view on a smaller scale, taken substantially along the line 2—2 of Fig. 1.

Fig. 3 is a view similar to Fig. 2 illustrating a seal wherein the turned-in end wall of the shell has a series of radial slots therein.

Figs. 4 to 7 inclusive are fragmentary cross-sectional views illustrating other forms of the invention.

Fig. 8 illustrates a ring of leather as severed from a cylindrical band of leather.

Fig. 9 illustrates how the ring of leather shown by Fig. 10 is deformed to provide a sealing ring such as shown by certain of the figures illustrating seals.

Fig. 10 illustrates how a similar ring of leather is deformed to provide a sealing ring such as shown by other of the figures illustrating seals.

Referring to Figs. 1 and 2, a rotary shaft is indicated at 10 and a stationary cage or housing on the shaft is indicated at 11. The seal comprises a shell 12 formed preferably from sheet metal, which has a cylindrical wall 13 fitting tightly in the housing 11 so as to prevent grease or lubricant flowing between the wall and housing. At one end of the wall 13, the shell is directed radially as indicated at 14, then at an angle to the shaft as indicated at 15 and then is shaped to provide a channel 16 directed parallel to the shaft and in spaced relation thereto so as to permit radial movement of the shaft with respect to the shell. The channel 16 receives one edge portion 17 of a sealing ring composed preferably of leather and in order to positively secure the ring in the channel and in a sealing manner therein, the free leg of the channel may be bent outwardly as indicated at 18 so as to crimp the leather where it enters the channel. From the channel, the leather is turned toward the shaft as indicated at 19 and then parallel to the shaft and into engagement therewith as indicated at 20. For normally urging the portion 20 of the sealing ring against the shaft at all times, an annular, contractile spring 21 extends around the outer portion of the sealing ring and is maintained within the shell by a radially disposed end wall 22 extending from the end of the cylindrical wall 13. The wall 22 initially is thinner than the wall 13 and is first disposed in the broken line position indicated at 23 and then is turned inwardly about the junction between the wall portion 13 and the thinner portion. A shell having a wall such as shown at 22, is also disclosed in my copending application for patent Serial No. 638,802, filed October 20, 1932, now Patent No. 2,005,446, issued June 18, 1935. The advantage of this turned-in wall 22 is that a separate washer for holding the spring in place is not necessary. Providing the thinner portion and a shoulder junction as a fulcrum line enables extending an integral end wall to a point adjacent the shaft without deformation of the wall 13.

The construction shown by Fig. 3 is like that shown by Figs. 1 and 2 with the exception that the end wall 22 is provided with circumferentially separated slots 24. These openings more readily allow lubricant in the housing at this side of the seal to flow into and out of the shell and this is helpful in avoiding undesirable temperatures to which sealing rings ordinarily may be subjected.

In the construction shown by Fig. 4, the shell has a shorter cylindrical wall 13 which naturally reduces the quantity of metal required, and in certain situations, the shorter wall is sufficient to properly support the seal in the housing. This shorter wall has a radially directed portion 25 and similarly terminates in a channel 16 at its inner edge. In other respects the seal shown by Fig. 4 is like that shown by Fig. 1.

The seal shown by Fig. 5 is like that shown by Fig. 1 except that a longer radial wall 26 is provided and the channel 16 is disposed in a radial position at the inner side of the radial wall. The sealing ring in this construction has a radially directed portion 27 and a longer axial portion 28 engaging the shaft. In other respects the construction is like those previously described.

The construction shown by Fig. 6 is similar to that shown by Fig. 5 with the exception that the cylindrical wall 13 is shorter and the channel 16 is disposed at the outer side of the radial wall 26. This construction, like that shown by Fig. 4, would require less metal and would be highly practical in situations where a shorter cylindrical wall 13 is satisfactory for rigidly positioning the shell within the housing.

The construction shown by Fig. 7 is similar to that shown by Fig. 4 excepting that a still shorter cylindrical wall 13 is provided and the turned-in wall 22 is not used. For retaining the spring 21 in place, a thin metal strip 29 is disposed between the sealing ring and the outer leg of the channel and this strip has fingers 30 which extend over the ring 21 in radially spaced relation to the spring and then inwardly at the axially outer side of the spring. This strip may be annular or split. The portion 20 of the sealing ring also may have a groove 31 for receiving the spring and in certain cases, the groove alone may be sufficient, without requiring the strip 29.

It will be observed that in all of the constructions that have been described, the sealing ring is sealed with respect to the shell by inserting a portion of the ring into a channel and crimping the metal to positively retain the ring in position and in a sealing manner. It also will be observed that the manner of fastening the sealing ring to and against portions of the shell may be effected independently of the cylindrical wall 13 and independently of the turned-in wall 22. Furthermore, it will be appreciated that the shell in each construction is integral and that the seal comprises a minimum of parts, namely, the integral shell, the sealing ring and the spring.

In manufacturing the sealing ring, leather may be wrapped around a cylindrical drum and the edges beveled and cemented as indicated at 34 in Fig. 2, and then rings of the leather may be severed from the cylinder to provide a cylindrical ring 35 as shown in Fig. 8. Then to provide the sealing ring shown by Fig. 1 and other figures, moisture may be applied to the leather and the latter may be molded to provide the turned-out sector 19 and the outwardly offset portion 17 which fits in the channels of the shells as shown by Fig. 9. The portion 20 retains its natural grain and shape and as a consequence the leather that engages the shaft is in its natural and undeformed condition. This seems to be of considerable importance in the efficiency and durability of the seal as it is the portion 20 that is subjected to the friction between it and the rotating shaft and which must be resiliently pressed against the latter to effect the seal. The deformed portion 17 fastened in the channel is not subjected to the deteriorating forces and factors that the portion 20 is subjected to and hence deforming the ring to form the portion 17 is not as undesirable.

The sealing ring shown by Fig. 10 and which may be used in the seal shown by Fig. 5 and others, may be formed from the ring 35 by outwardly turning and molding the flange 27 without deforming the portion 28. In this construction also the portion 28 which engages the shaft is not deformed and consists of leather in its natural grain condition.

While the leather ring is employed preferably joined and cemented as indicated at 34 in Fig. 2, it is possible to use other materials and even leather and to provide a ring without any joints. For example, a ring of leather might be stamped from a sheet of leather and then the parts deformed to provide either of the rings shown by Figs. 9 and 10 although this is not as preferable as then the portions which would engage the shaft would be deformed from the natural shape and grain condition of the leather.

Seals such as illustrated and described may be manufactured economically and with a minimum of material and labor cost. Furthermore, they are highly efficient as one edge of the leather is rigidly and positively connected to the back wall of the shell in a sealing manner and the opposite edge portion of the ring is resiliently but firmly held against the shaft. By employing a leather ring constructed with that portion engaging the shaft in its natural and undeformed condition, a better sealing engagement may be had with the shaft as this portion is in its natural and unstretched condition. Only one piece of sheet metal is employed and this considerably reduces the material and labor cost not only in manufacturing the shell but in assembling the seal.

Although more than one form of the invention has been illustrated and described in detail, it will be apparent to those skilled in the art that various modifications may be made without departing from the scope of the appended claims.

I claim:

1. A grease seal comprising an annular sheet metal outer wall, a sheet metal end wall projecting towards the axis of the outer wall, said end wall inwardly of the outer wall having an annular channel portion which is spaced from the outer wall by an intervening portion of the end wall, an annular sealing ring having a portion disposed in said channel portion and clampingly held therein by the walls of the channel, and resilient means for radially contracting a portion of the sealing ring outside of the channel portion.

2. A grease seal comprising an annular sheet metal outer wall, a sheet metal end wall projecting towards the axis of the outer wall, said end wall inwardly of the outer wall having an annular channel portion which is spaced from the outer wall by an intervening portion of the end wall, an annular sealing ring having a portion disposed in said channel portion and clampingly held therein by the walls of the channel, and resilient means for radially contracting a portion of the sealing ring outside of the channel portion, said channel portion having its walls directed substantially in an axial direction and being open towards the other end of the outer wall.

3. A grease seal comprising an annular sheet metal outer wall, a sheet metal end wall projecting towards the axis of the outer wall, said end wall having an annular channel portion which is spaced from the outer wall by an intervening portion of the end wall, an annular sealing ring having a portion disposed in said channel portion and clampingly held therein by the walls of the channel, resilient means for radially contracting a portion of the sealing ring outside of the channel portion, and means including an inwardly turned flange at the other end of the outer wall for retaining the resilient means in axial position.

4. A grease seal comprising a one-piece sheet metal shell having an annular outer wall and inturned end wall portions, one of said inturned wall portions terminating at its inner edge in a hollow annular bead which opens toward the opposite end wall portion, and sealing means within the shell and including an annular sealing ring having a portion clampingly held within the bead.

5. A grease seal comprising an annular outer wall, an inwardly directed sheet metal end wall which is bent first in one direction and then in the opposite direction to form a channel, which channel is separated from the outer wall by an intervening portion of the end wall, a sealing ring having an edge portion disposed in said channel, and radially contractile means for contracting another portion of the ring.

6. A grease seal comprising an annular shell having an inwardly directed sheet metal end wall which is bent first in one direction and then in the opposite direction to form an axially directed channel, which channel is spaced inwardly from the outer periphery of the shell by an intervening portion of the end wall, which intervening portion includes a conical portion, a sealing ring in the shell with one of its edges clamped in the channel, and means for radially contracting the other edge of the ring.

7. In a seal for insertion as a complete pre-assembled unit in a housing about a centrally located shaft, a sheet metal outer wall for pressed-fit engagement with the inside of the housing, an inwardly extending sheet metal end wall which is centrally apertured to provide clearance for the shaft and is flanged at the aperture first in one direction along the shaft and then in the opposite direction to form a channel, and a packing ring of compressible material which is clamped in the channel between the oppositely flanged portions of the end wall.

8. In a seal for insertion as a complete pre-assembled unit in a housing about a centrally located shaft, a sheet metal outer wall for pressed-fit engagement with the inside of the housing, an inwardly extending sheet metal end wall which is centrally apertured to provide clearance for the shaft and is flanged at the aperture first in one direction along the shaft and then in the opposite direction to form a channel, and a packing ring of compressible material which is clamped in the channel between the oppositely flanged portions of the end wall, the end wall between the oppositely flanged portions thereof and the outer wall being dished.

9. In a seal for insertion as a complete pre-assembled unit in a housing about a centrally located shaft, a sheet metal outer wall for pressed-fit engagement with the inside of the housing, an inwardly extending sheet metal end wall which is centrally apertured to provide clearance for the shaft and is flanged at the aperture first in one direction along the shaft and then in the opposite direction to form a channel which opens in the direction in which the outer wall extends from the end wall, and a packing ring of compressible material having a large diameter edge which is clamped in the channel between the oppositely flanged portions of the end wall and a small diameter edge which is adapted to seal against the shaft, the end wall between the oppositely flanged portions thereof and the outer wall being dished in the direction of projection of the small diameter edge of the packing ring.

10. In a seal for insertion as a complete pre-assembled unit in a housing about a shaft, a sheet metal outer wall for pressed-fit engagement with the inside of the housing, an inwardly extending sheet metal end wall which is centrally apertured to clear the shaft and is provided with a flange about the aperture which projects from the end wall in the same general direction as the outer wall, a packing ring of compressible material sleeved over said flange and provided beyond the edge of the flange with a portion of reduced diameter for sealing engagement with the shaft, and means in the space between the outer wall of the seal and the flange on the end wall against which the packing ring is compressed by the flange, said means consisting of a second flange on the end wall outwardly of the first flange.

11. In a seal for insertion as a complete pre-assembled unit in a housing about a shaft, an outer wall for pressed-fit engagement with the inside of the housing, an inwardly extending end wall which is centrally apertured to clear the shaft and is provided with a flange about the aperture which projects from the end wall in the same general direction as the outer wall, a packing ring of compressible material sleeved over said flange and provided beyond the edge of the flange with a portion of reduced diameter for sealing engagement with the shaft, and a second flange on the end wall outwardly of the first flange and inwardly of the outer wall in encompassing relation to the sleeved-over portion of the packing ring, the outside diameter of said second flange being considerably less than the inside diameter of the outer wall, and said sleeved-over portion of the packing ring being clamped between said flanges.

12. In a seal for insertion as a complete pre-assembled unit in a housing about a shaft, an outer wall for pressed-fit engagement with the inside of the housing, an inwardly extending end wall which is centrally apertured to clear the shaft and is provided with a flange about the aperture which projects from the end wall in the same general direction as the outer wall, a packing ring of compressible material sleeved over said flange and provided beyond the edge of the flange with a portion of reduced diameter for sealing engagement with the shaft, and means surrounding the sleeved-over portion of the packing ring for holding the latter in tightly clamped engagement with the flange, said last mentioned means being so constructed and arranged as to leave an open space between the clamped portion of the packing and the outer pressed-fit wall of the seal.

13. In a seal for insertion as a complete pre-assembled unit in a housing about a shaft, the combination with a sheet metal casing, of a flexible packing ring of generally Z-shape form within the casing having an axially extending portion of small diameter at one end for sealed engagement with the shaft and an axially extending portion of larger diameter at the other end for sealed engagement with the casing, said casing being of considerably larger diameter than the large diameter end of the packing ring and including an outer cylindrical wall for pressed-fit engagement with the housing and a centrally apertured end wall which is formed as an integral part of the outer wall and extends inwardly from one end of the latter, and means on the end wall in inwardly spaced relation to the outer wall for attaching the large diameter portion of the packing ring to the end wall, said packing ring being attached to and supported solely from the end wall independently of the outer wall, with the attaching means and the packing set inwardly from the outer wall, and with an annular space present within the casing between the outer wall and the packing at its point of attachment to the end wall, which annular space is in open communication with the face of the seal toward which the small diameter portion of the packing ring projects.

14. In a seal for insertion as a complete pre-assembled unit in a housing about a shaft, the combination with a hollow casing, of a flexible packing ring within the casing having a portion of small diameter for sealed engagement with the shaft and a portion of larger diameter for sealed engagement with the casing, said casing being of considerably larger diameter than the large diameter portion of the packing ring and including an outer wall for sealed association with the housing and a centrally apertured end wall which extends inwardly from one end of the outer wall, and means on the end wall in inwardly spaced relation to the outer wall for attaching the large diameter portion of the packing ring to the end wall, said packing ring being attached to and supported solely from the end wall independently of the outer wall, with the attaching means and the packing set inwardly from the outer wall, and with an annular space present within the casing between the outer wall and the packing at its point of attachment to the end wall.

15. In a seal for insertion as a complete pre-assembled unit in a housing about a shaft, the combination with a sheet metal casing, of a flexible packing ring within the casing having an axially extending portion of small diameter at one end for sealed engagement with the shaft and a portion of larger diameter at the other end for sealed engagement with the casing, said casing being of considerably larger diameter than the large diameter end of the packing ring and including an outer cylindrical wall for pressed-fit engagement with the housing and a centrally apertured end wall which is formed as an integral part of the outer wall and extends inwardly from one end of the latter, an integral portion of the end wall having interlocking engagement with the outer portion of the packing ring in inwardly spaced relation to the outer wall, said packing ring being attached to and supported solely by the sheet metal end wall independently of the outer wall, and said interlocking engagement between the attached portions consisting solely of an integrally formed continuous groove in the edge of one of the portions in which the edge of the other portion is enveloped.

JOHN R. WINTER.